United States Patent
Kobayashi

(10) Patent No.: US 6,635,373 B2
(45) Date of Patent: Oct. 21, 2003

(54) FUEL CELL SYSTEM AND METHOD

(75) Inventor: Katsuya Kobayashi, Tokyo (JP)

(73) Assignee: Nissan Motor Co., Ltd., Yokohama (JP)

(*) Notice: Subject to any disclaimer, the term of this patent is extended or adjusted under 35 U.S.C. 154(b) by 291 days.

(21) Appl. No.: 09/793,462

(22) Filed: Feb. 27, 2001

(65) Prior Publication Data

US 2001/0008718 A1 Jul. 19, 2001

(30) Foreign Application Priority Data

Jan. 3, 2000 (JP) ........................ 2000-055482

(51) Int. Cl.⁷ .................... H01M 8/04; H01M 8/06
(52) U.S. Cl. .................... 429/23; 429/34
(58) Field of Search .................... 429/13, 23, 24, 429/25, 34

(56) References Cited

U.S. PATENT DOCUMENTS 5,154,986 A * 10/1992 Takechi et al. ............... 429/23
6,159,626 A * 12/2000 Keskula et al. ............... 429/22
6,495,277 B1 * 12/2002 Edlund et al. ............... 429/22

FOREIGN PATENT DOCUMENTS

| JP | 01-039069 | 8/1989 |
| JP | 06-174808 | 6/1994 |
| JP | 08-182208 | 7/1996 |
| JP | 08-289410 | * 11/1996 |
| JP | 2002-25594 | * 1/2002 |

* cited by examiner

Primary Examiner—Patrick Ryan
Assistant Examiner—Tracy Dove
(74) Attorney, Agent, or Firm—Foley & Lardner

(57) ABSTRACT

A fuel cell system provided with a secondary battery supplying electric power to an outer load and a fuel cell supplying power at least to the secondary battery is controlled such that, by calculating charge allowance amount level in the secondary battery and calculating an excess amount of electric power that can be generated by an excess amount of fuel gas produced in the fuel cell system when operation of the fuel cell is stopped, the charge allowance amount level in the secondary battery is equal to or higher than the excess amount of electric power.

19 Claims, 3 Drawing Sheets

FUEL CELL SYSTEM AND METHOD

BACKGROUND OF THE INVENTION

The present invention relates to a fuel cell system and a method, and more particularly to a fuel cell system in which excess hydrogen gas can be controlled and a method of controlling the fuel cell system.

A fuel cell system is a device in which the energy of chemical reaction caused by using fuel is converted directly into electric power.

Particularly, a fuel cell system includes a pair of electrodes (one is an anode and the other a cathode) which are separated by an electrolyte membrane located therebetween. In the system, hydrogen-rich gas is supplied to the anode (fuel pole) while an oxygen contained gas such as air is supplied to the cathode (oxidant pole) to generate electric power through the electrochemical reactions which occur on the surfaces of the two electrodes on their sides opposing to the electrolyte. The respective electrochemical reactions are as follows:

The anode reaction: $H_2 \rightarrow +2H^+ + 2e^-$; and

The cathode reaction: $2H^+ + 2e^- + (1/2)O_2 \rightarrow H_2O$.

In such a system, a reformer that allows methanol to react using water-vapor steam to generate a fuel gas containing a large amount of hydrogen can be used to generate hydrogen-rich gas as the electromotive fuel.

A compressor that intakes air from any outer source and compresses the air can be used to generate oxidant gas containing oxygen.

The compressed air from the compressor is supplied to, for example, an after-cooler where the air is cooled down and then to the cathode of the fuel cell while methanol gas is supplied from a fuel tank to the reformer where the methanol gas is formed into hydrogen-rich gas which is then supplied to the anode of the fuel cell.

Automotive applications of such a fuel cell system has been contemplated since such a system is advantageous over secondary battery for electric vehicle applications in terms of a standard mileage that a vehicle can be traveled, service conditions for a fuel infrastructure, and so on.

It has been further contemplated that both fuel cell and secondary battery are installed in an electric vehicle such that electric power source can be switched between them depending on the driving conditions, thereby enabling efficient supply of electric power.

Japanese Patent Application Laid-Open Publication No. H8-182208 discloses a configuration in which a fuel cell is employed as a back-up power supply for charging the secondary battery.

Japanese Patent Application Examined Publication No. H1-39069, and Japanese Patent Application Laid-Open Publication Nos. H6-174808 and H8-182208 disclose methods for detecting residual capacity level in a secondary battery.

SUMMARY OF THE INVENTION

The present inventor found, however, that when operation of a fuel cell system is stopped, hydrogen gas present in the pathway extending from the reformer to the fuel cell stack in the system may often remain as an excess gas. Continuous supply of such excess hydrogen gas in an unreacted form to the combustor may sometimes result in oversupply of hydrogen gas, i.e., the amount of hydrogen supplied to the combustor surpluses the disposal capacity of the combustor.

It is possible to use such excess hydrogen gas to generate electric power to be used for charging a secondary battery. In such a case, however, the same situation will also occur especially when the current secondary battery to which the electric power generated is supplied is already in a full-charged state if the charging capacity is not taken into consideration.

Alternatively, a fuel cell may be used as a back-up battery for charging a secondary battery. This case may also have the same situation when the current secondary battery to which the electric power from the fuel cell is supplied is already in a full-charged state if the charging capacity is not taken into consideration.

In view of the above investigations, the present invention has been made and provides a fuel cell system that can control the excess amount of hydrogen gas within a proper range as well as a method of controlling the fuel cell system.

A fuel cell system of the present invention is provided with: a secondary battery supplying electric power to an outer load; a fuel cell supplying electric power at least to the secondary battery; a charge allowance amount calculator calculating charge allowance amount level in the secondary battery; an excess electric power calculator calculating an excess amount of electric power that can be generated by an excess fuel gas remaining in the fuel cell system when the supply of electric power that is supplied to the outer load is stopped; and a controller controlling the charge allowance amount level in the secondary battery determined by the charge allowance amount calculator so as to be equal to or higher than the excess amount of electric power determined by the excess electric power calculator.

In other words, a fuel cell system of the present invention is provided with: a secondary battery supplying electric power to an outer load; a fuel cell supplying electric power at least to the secondary battery; means for calculating charge allowance amount level in the secondary battery; means for calculating an excess amount of electric power that can be generated by an excess fuel gas produced in the fuel cell system when the operation of the fuel cell is stopped; and means for controlling the charge allowance amount level in the secondary battery so as to be equal to or higher than the excess amount of electric power.

Besides, a met o o controlling a fuel cell system of the present invention is applied to a fuel cell system having a secondary battery supplying electric power to an outer load and a fuel cell supplying electric power at least to the secondary battery. Such a method of controlling a fuel cell system calculates charge allowance amount level in the secondary battery; calculates an excess amount of electric power that can be generated by an excess fuel gas remaining in the fuel cell system when the supply of electric power that is supplied to the outer load is stopped; and controls the charge allowance amount level in the secondary battery so as to be equal to or higher than the excess amount of electric power.

Other and further features, advantages, and benefits of the present invention will become more apparent from the following description taken in conjunction with the following drawings.

DETAILED DESCRIPTION OF THE PREFERRED EMBODIMENT

Hereinafter, a fuel cell system according to one embodiment of the present invention and a method of controlling the fuel cell system will be described in detail in reference to the attached drawings.

Figure 1:
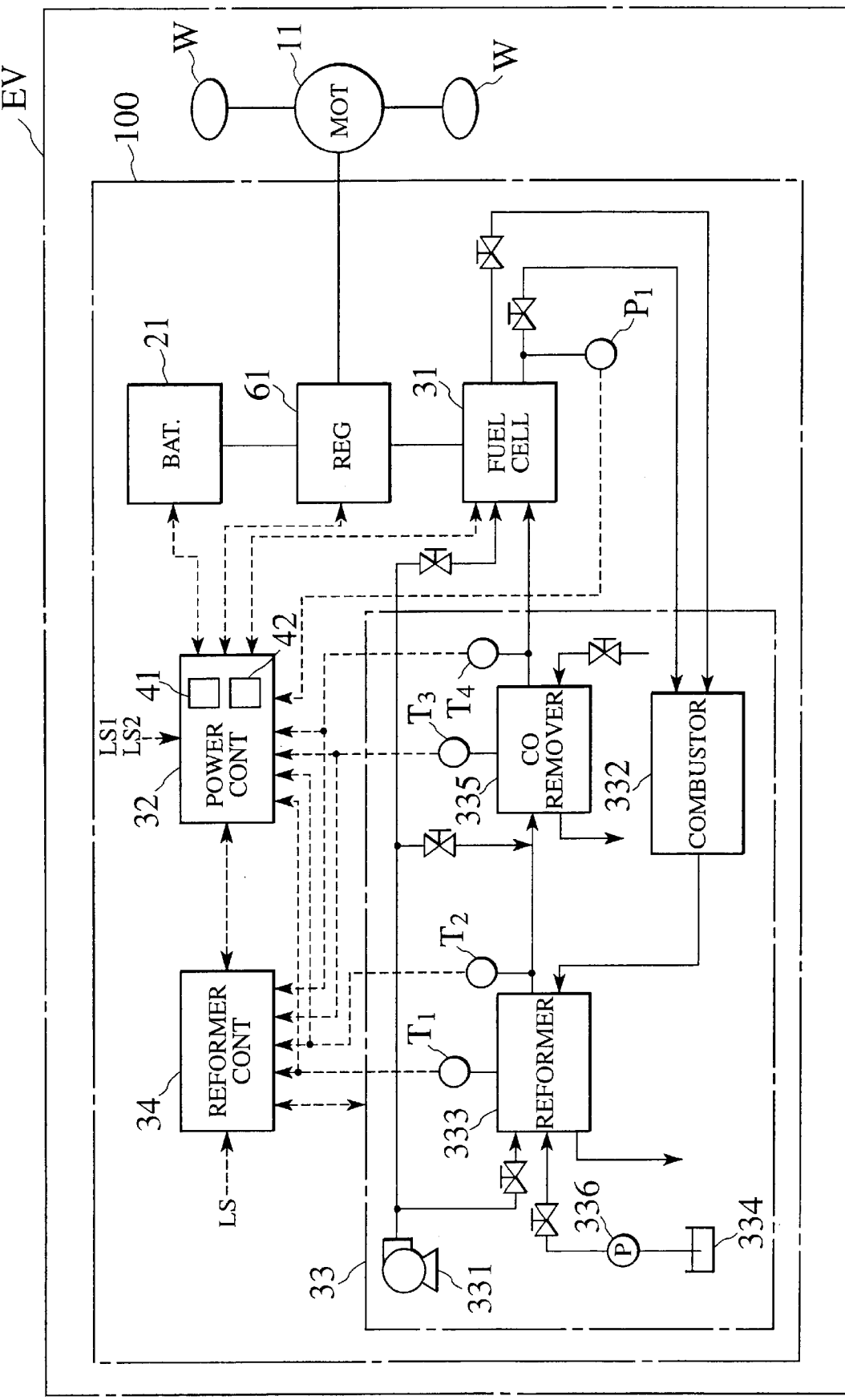
FIG. 1 is a block diagram illustrating a fuel cell system according to an embodiment of the present invention.

As shown in FIG. 1, the fuel cell system 100 according to the present embodiment is installed in an electric vehicle EV.

A fuel cell (fuel cell stack) 31 charges a secondary battery 21 via an electric power regulator 61 and directly or indirectly drive a motor 11 of the electric vehicle EV via the electric power regulator 61, in the fuel cell system 100. Wheels W are connected to the motor 11.

The electric power regulator 61 supplies electric power from the battery 21 to the motor 11, or derive electric power from the fuel cell stack 31 to charge the battery 21, or supply electric power from the fuel cell stack 31 directly to the motor 11.

In the fuel cell stack 31, hydrogen-rich gas is supplied to its fuel pole (−) while air from a compressor 331 is supplied to its oxidant pole (+) to cause electrochemical reactions in the presence of catalyst, thereby generating electric power.

Excess amounts of hydrogen gas and air supplied to the fuel and oxidant poles of the fuel cell stack 31, respectively, can be then transported to a combustor 332.

Hydrogen-rich gas to be supplied to the fuel pole of the fuel cell stack 31 is produced by a reformer 333.

A reformer system 33, which comprises the reformer 333 and the combustor 332, further includes a fuel tank 334 which contains liquid fuel mixture (reforming material) of methanol and an excess amount of water and a carbon monoxide remover 335.

To the reformer 333 are supplied the reforming material from the fuel tank 334 via a pump 336 and air as an oxidant from the compressor 331. In the reformer 333 vaporized reforming material is reformed through reforming reaction in the presence of catalyst to produce reformed gas containing hydrogen.

The carbon monoxide remover 335 placed downstream of the reformer 333 receives air from the compressor 331 to selectively oxidize carbon monoxide contained in the reformed gas, thereby reducing the concentration of carbon monoxide in the fuel cell stack 31. Hydrogen-rich gas (reformed gas) obtained as described above will then be supplied to the fuel pole of the fuel cell stack 31.

The combustor 332 receives excess amounts of reformed gas and air from the fuel cell stack 31 and burns them in the presence of combustion catalyst to produce combustion energy which is then supplied to the reformer 333, thereby performing exhaust gas treatment and promoting the reforming reaction.

Temperature sensors T1, T2, T3 and T4 are placed within the reformer 333, at an outlet pipe connected to the reformer 333, within the carbon monoxide remover 335, and at an outlet pipe connected to the carbon monoxide remover 335, respectively. Signals produced by these temperature sensors are transmitted to the electric power controller 32 and a reformer controller 34.

A pressure sensor P1 is placed at an outlet port of the fuel pole of the fuel cell stack 31. Signal produced by the sensor P1 is transmitted to the electric power controller 32.

The electric power controller 32 has a battery monitor (charge allowance amount calculator) 41 and an excess electric power calculator 42.

The battery monitor 41 of the electric power controller 32 calculates and monitors charge allowance amount CG in the battery 21. The charge allowance amount CG in the battery 21 represents the amount of electric charge that can be stored into the battery 21 currently having any residual capacity until the battery 21 reaches to a charged state that shows a predetermined reference capacity. In other words, charge allowance amount CG in the battery 21 can be determined by: calculating the maximum output obtainable from the battery 21 based on discharge current and terminal voltage of the battery 21; calculating the residual capacity of the battery from the maximum output by using an experimentally obtained correlation function representing the relationship between maximum output and battery capacity which has previously been determined; and determining the difference between the reference capacity and the residual capacity. Of course, this calculation process can not be exclusive. For example, charge allowance amount CG may also be determined by using its residual capacity in the battery, which can be obtained by: serially calculating the relationship between maximum output density and discharge electric power amount of the battery 21 based on the terminal voltage and discharge current of the battery 21; assuming the relationship between a future maximum output density and the discharge electric power amount based on the calculated relationship between maximum output density and discharge electric power amount of the battery 21 by using regression process of first or higher order; and subtracting current discharge electric power amount from the discharge electric power amount at a time when the characteristic curve showing the relationship between the assumed maximum output density and the discharge electric power amount transverses the maximum output density at completion of discharge.

The excess electric power calculator 42 of the electric power controller 32 calculates the excess electric power amount F generated in the fuel cell system 100 using the following equation:

$$F=(Q-q) \cdot E \cdot \beta / \gamma$$

where F represents the excess electric power amount (kJ), Q represents an amount of hydrogen which can remain in the fuel cell system (mol), q represents an amount of hydrogen (mol) that can be processed in a combustor 332, E represents a lower heating value of hydrogen (kJ/mol), $\beta$ represents the stack efficiency of the fuel cell 31, and $\gamma$ represents an excess of hydrogen ratio ($\geq 1.0$) in the fuel cell stack 31.

The amount of hydrogen q which can be processed in the combustor 332 is a constant that can be determined according to the specification of the combustor 332 employed. The lower heating value of hydrogen E is also a constant. Stack efficiency $\beta$ and an excess of hydrogen ratio $\gamma$ can be determined by using, for example, mapping.

Amount of hydrogen Q can be represented by the amount of hydrogen which can remain when the supply of electric power that is supplied to the outer load (motor 11) is stopped. Accordingly, value Q can be calculated by the following equation:

$$Q=Vx \cdot \alpha \cdot P \cdot 273/(T+273)/22.4$$

where Vx (liter) represents the total volume of gas present in the reformer, pipes and the hydrogen pole of the fuel cell stack; $\alpha$ represents an average content ratio of hydrogen contained in the reformed gas; P (kgf/cm$^2$ G) represents a pressure in the hydrogen pole of the fuel cell stack 31 obtained based on a detection value produced by the pressure sensor P1; and T (°C.) represents an average temperature of the reformed gas calculated by using detection values produced by the temperature sensors T1 to T4 as required.

In summary, the amount of hydrogen Q can be determined by detecting the pressure P in the hydrogen pole and an average temperature T of the reformed gas in the fuel cell stack since both the volume of gas Vx and the average content ratio α of hydrogen in the reformed gas are constants that can be determined from the specification of the reformer employed.

Reformer controller 34 operates in cooperation with the electric power controller 32 to control the amount of hydrogen-rich gas to be generated and supplied to the fuel cell stack 31 in response to an instruction signal LS corresponding to an outer load such as an acceleration stroke.

Hereinafter, operation of the fuel cell system 100 according to the present embodiment will be described.

Figure 2:
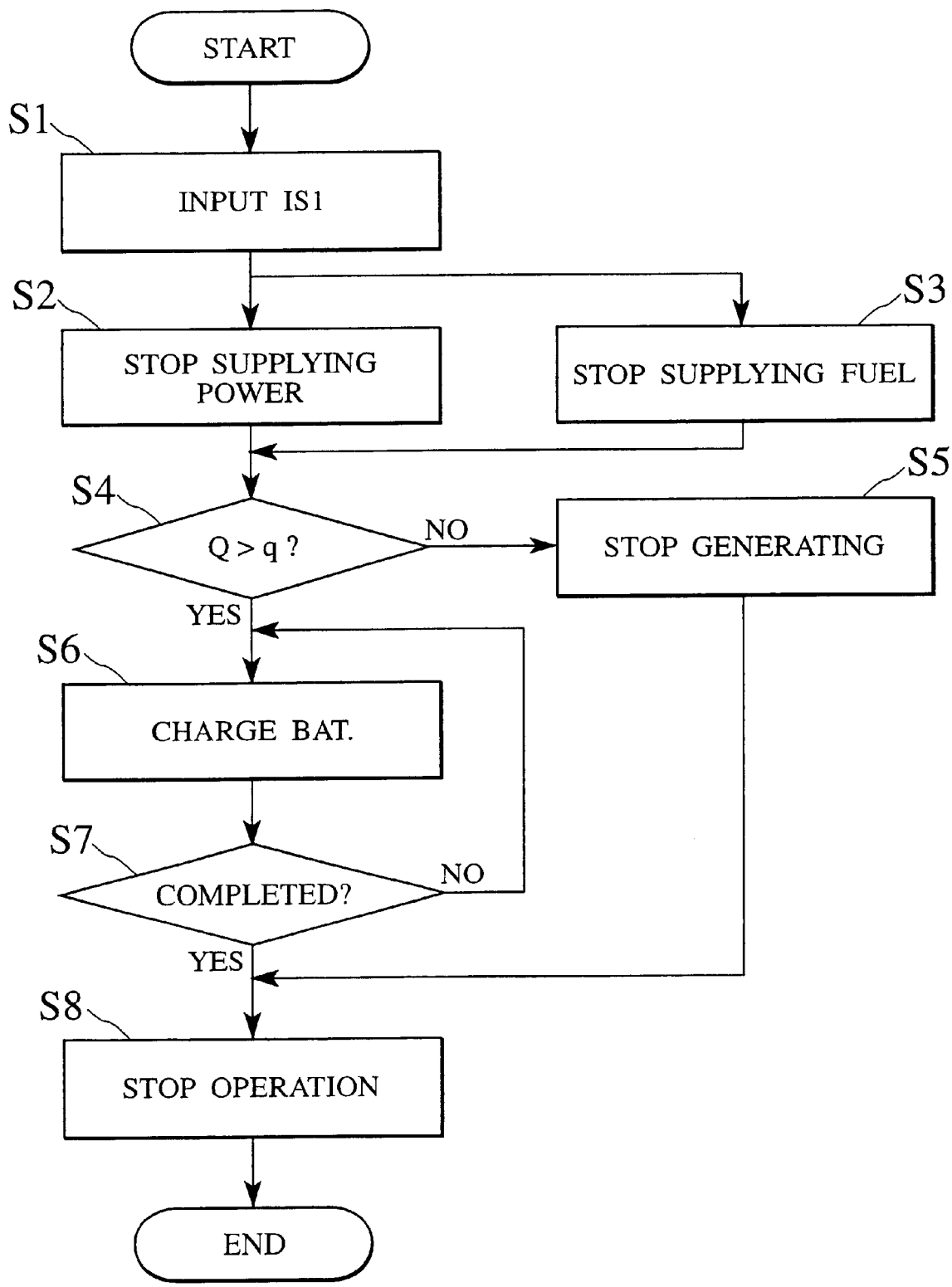
FIG. 2 is a flow chart showing a control process for stopping operation of the fuel cell system according to the embodiment.

Referring to FIG. 2, a flow chart showing a control process for stopping operation of the fuel cell system 100 is provided.

As shown in FIG. 2, when the electric power controller 32 receives a stop instruction IS1 at step S1, it stops power supply from the electric power regulator 61 to the motor 11 at step S2.

Further, the reformer controller 34 stops supply of reforming material to the reformer 333 at step S3.

At this time, hydrogen gas will remain in the pathway extending from the reformer 333 to the fuel cell stack 31. It is possible to use the remaining hydrogen gas to generate electric power if continuously permitting operation of the fuel cell stack 31. The electric power generated can be suitably used for charging the battery 21 when the electric vehicle EV is not travelling i.e., motion of the motor 11 is stopped.

According to the present embodiment, the electric power controller 32 controls power supply from the battery 21 to the motor 11 via the electric power regulator 61 in advance when, for example, the electric vehicle is travelling, by: calculating charge allowance amount CG in the battery 21 at the battery monitor 41 of the electric power controller 32; calculating an excess electric power amount F which is generated by an excess amount of hydrogen gas at the excess electric power calculator 42; and keeping the charge allowance amount CG in the battery 21 equal to or higher than the energy F during, for example, travel of the electric vehicle.

If the electric power controller 32 determines that the excess amount of hydrogen gas Q surpluses the amount of hydrogen q which can be processed in the combustor 332 at step S4, then the excess electric power generated by the excess amount of hydrogen gas is stored into the battery 21 via the electric power regulator 61 at step S6.

If the electric power controller 32 determines that charging of the battery 21 has not been yet completed at step S7, then the process returns to step S6 to repeat the procedure for charging the battery 21.

On the other hand, if the electric power controller 32 determines that charging of battery 21 has been completed at step S7, then the procedure for operation of the fuel cell system 100 will be stopped at step S8. According to the present embodiment, it is determined that charging of the battery 21 is completed when the charge allowance amount CG in the battery 21 is substantially equal to zero. This value is not exclusive and any other suitable value can be used.

Alternatively, when the electric power controller 32 determines that the excess amount of hydrogen Q is equal to or smaller than the amount of hydrogen q that can be processed in the combustor 332 at step S4, then the process proceeds to step S5 where power generation in the fuel cell stack 31 will be stopped and the excess amount of hydrogen gas will be introduced into the combustor 332 instead of storing the excess electric power in the battery 21. Next, this process for operation of the fuel cell system 100 will be stopped at step S8.

Figure 3:
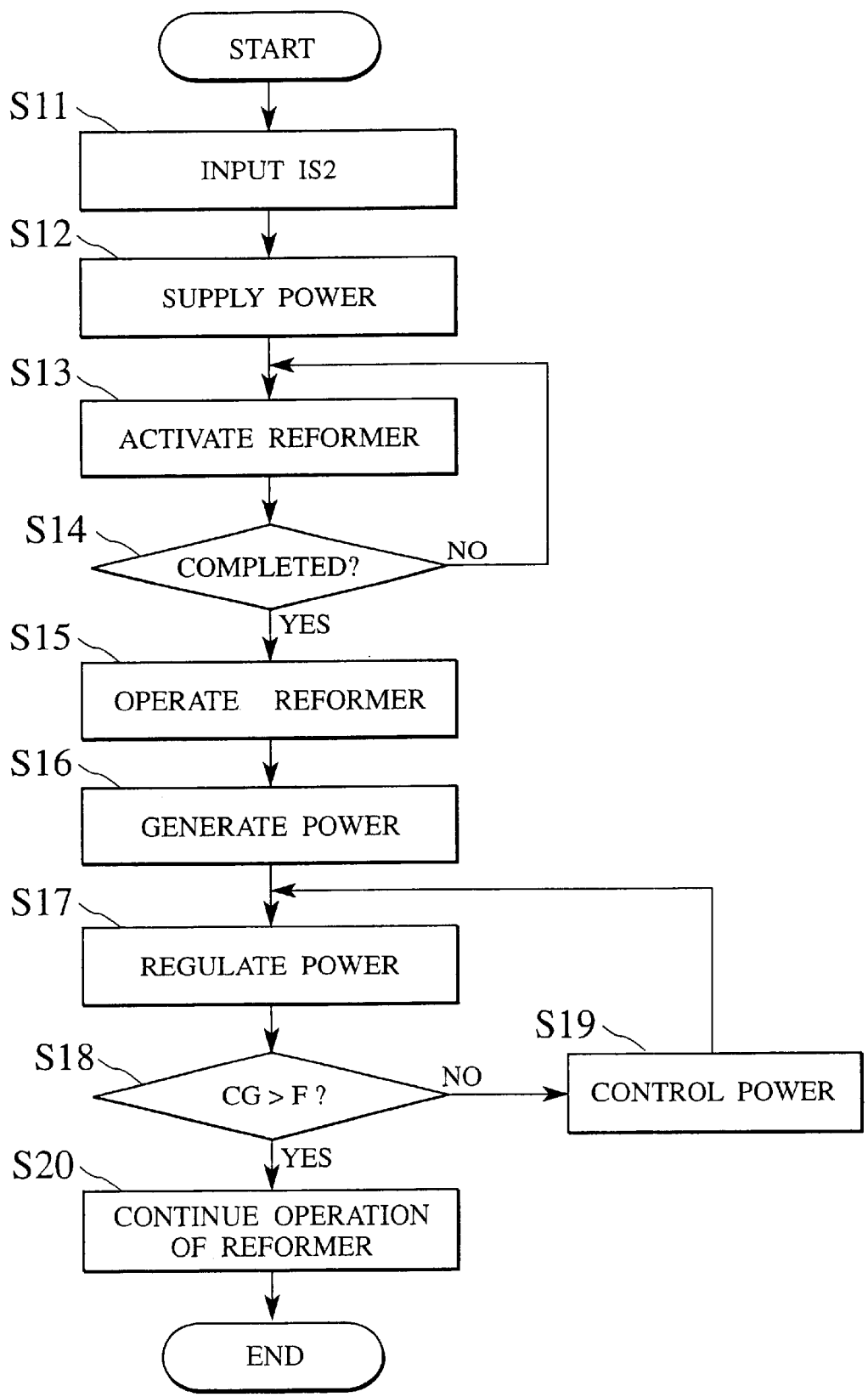
FIG. 3 is a flow chart showing a control process for starting and restarting operation of the fuel cell system according to the embodiment.

Hereinafter, a control process for starting and restarting operation of the fuel cell system 100 will be described in reference to FIG. 3.

First, when the electric power controller 32 receives starting or restarting instruction signal IS2 at step S11, then it will supply electric power from the battery 21 to the motor 11 via the electric power regulator at step S12.

The reformer controller 34 will activate or reactivate the reformer 333 by supplying reforming material to the reformer 333 at step S13. Step S14 determines if the reformer 333 is sufficiently activated or reactivated. If not, the process will then return to step S13 to repeat the procedure for activating the reformer 333 until the reformer 333 is sufficiently activated or reactivated.

When the reformer 333 is sufficiently activated or reactivated, operation of the reformer 333 is started at step S15, and then reformed gas will be supplied to the fuel cell stack 31 which thus starts power generation.

At the step 17, electric power controller 32 calculates and monitors charge allowance amount CG in the battery 21 while switching the electric power source of the motor between the battery 21 and the fuel cell stack 31.

Next sequent step Si 8, if the electric power controller 32 determines that the charge allowance amount CG in the battery 21 surpluses the excess electric power amount F, which corresponds to an amount of hydrogen gas obtained by subtracting the amount of hydrogen q that can be processed in the combustor 332 from the amount of hydrogen Q (which means that it will be possible to charge the battery 21), the process then proceeds to step S20 where the reformer controller 34 permits continuous operation of the reformer 333 under the same conditions, thereby keeping output from the fuel cell stack 31 remained.

On the other hand, when the electric power controller 32 determines that the charge allowance amount CG in the battery 21 is equal or smaller than the excess electric power amount F, which corresponds to an amount of hydrogen gas obtained by subtracting the amount of hydrogen q that can be processed in the combustor 332 from the excess amount of hydrogen generated Q at step S18, the reformer controller 34 then regulates output from the reformer 333 such that production of hydrogen gas can be reduced in the reformer 333 because an excess amount of hydrogen gas will be generated after operation is stopped. As a result, output from the fuel cell stack 31 will be reduced. Next, the process returns to step S17.

Particularly, the reformer controller 34 restricts production of hydrogen gas to be supplied to the fuel cell stack 31 at step S19 when the charge allowance amount CG in the battery 21 is equal or smaller than the excess electric power amount F and when the increase rate of the output load of the fuel cell system 100 with respect to the motor 11 corresponding to an outer load is greater than zero (e.g., when the operation load of the electric vehicle EV is changed from low to high). That is, next, the process will return to step S17 where the electric power controller 32 supplies electric power preferentially from the battery 21 to the motor 11 via the electric power regulator 61. The power supply from the battery 21 is likely to decrease especially when hydrogen gas is responsively supplied to the fuel cell stack 31 since the electric power generated in the fuel cell stack 31 can be used directly. In such a case, a battery can frequently have too small charge allowance amount CG to provide sufficient space for the excess electric power amount F. To avoid this, electric power is supplied preferentially from the battery 21 to the motor 11 (an outer load) while restricting production of hydrogen gas so that the electric power can efficiently be consumed as well as that the electric power produced by the excess amount of hydrogen gas can efficiently be stored into the battery 21.

As described above, by calculating and monitoring charge allowance amount level in the secondary battery while calculating an excess electric power that can be generated by an excess fuel gas produced when operation of the fuel cell is stopped, both the secondary battery and the fuel cell are controlled such that the charge allowance amount level is equal to or greater than the excess electric power, and electric power generated by an excess fuel gas produced when operation of fuel cell is stopped can be stored into the secondary battery according to the present embodiment. In this way, electric power can efficiently be consumed as well as combustion of excess fuel gas can be efficiently prevented in the combustor.

Further, output from a fuel gas generator such as a reformer is compared with charge allowance amount in the secondary battery during driving mode, and when the output load applied to an outer load such as operation load is changed from low to high, production of fuel gas will be restricted while electric power will be supplied preferentially from the secondary battery to the outer load. Therefore, the electric power generated by the excess amount of fuel gas can certainly be stored into the secondary battery even when operation of the fuel cell with responsive reactivation of fuel gas is stopped, thereby enabling efficient consumption of electric power and preventing combustion of excess fuel gas.

Further, the secondary battery can be charged only when the excess amount of hydrogen surpluses an amount that can be burned in the combustor, whereby it is possible to control fuel supply depending on current driving condition.

The entire content of a Patent Application No. TOKUGAN 2000-55482 with a filing date of Mar. 1, 2000 in Japan is hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. A fuel cell system, comprising:
    a secondary battery configured to supply electric power to an outer load;
    a fuel cell configured to supply electric power to the secondary battery and the outer load;
    a charge allowance amount calculator for calculating charge allowance amount level in the secondary battery;
    an excess electric power calculator for calculating an excess amount of electric power that can be generated by an excess fuel gas remaining in the fuel cell system when a supply of electric power from the fuel cell system to the outer load is stopped; and
    a controller connected to the charge allowance amount calculator and the excess electric power calculator.

2. A fuel cell system according to claim 1, wherein the controller is configured to control the secondary battery and/or the fuel cell.

3. A fuel cell system according to claim 1, wherein the controller includes an electric power controller so as to store the excess amount of electric power into the secondary battery.

4. A fuel cell system according to claim 3, wherein the electric power controller is configured to switch a power source of the outer load between the secondary battery and the fuel cell.

5. A fuel cell system according to claim 1, wherein the controller is configured to restrict production of fuel to be supplied to the fuel cell if an increase rate of output load of the fuel cell system with respect to the outer load is greater than zero and if the charge allowance amount in the secondary battery is lower than the excess amount of electric power.

6. A fuel cell system according to claim 5, wherein the controller includes an electric power controller so as to supply electric power from the secondary battery to the outer load.

7. A fuel cell system according to claim 1, further comprising a combustor, and wherein fuel used in the fuel cell includes hydrogen and the excess amount of electric power F (kJ) is calculated by the following equation:

$$F=(Q-q)\cdot E\cdot \beta/\gamma$$

where Q represents an amount of hydrogen which can remain in the fuel cell system when the supply of electric power to the outer load is stopped (mol), q represents an amount of hydrogen that can be processed in the combustor (mol), E represents a lower heating value of the hydrogen (kJ/mol), β represents the stack efficiency of the fuel cell, and γ represents an excess of hydrogen ratio ($\geq 1.0$) in the fuel cell.

8. A fuel cell system according to claim 7, wherein the controller is configured to store the excess amount of electric power into the secondary battery when (Q−q) is equal or greater than zero, while the controller does not store the excess amount of electric power into the secondary battery but introduces the excess fuel gas into the combustor when (Q−q) is smaller than zero.

9. A fuel cell system according to claim 1, further comprising a reformer configured to reform fuel to be used in the fuel cell, and wherein the controller includes a reformer controller configured to control the reformer.

10. A fuel cell system, comprising:
    a secondary battery configured to supply electric power to an outer load;
    a fuel cell configured to supply electric power to the secondary battery and the outer load;
    first calculating means for calculating charge allowance amount level in the secondary battery;
    second calculating means for calculating an excess amount of electric power that can be generated by an excess fuel gas remaining in the fuel cell system when a supply of electric power from the fuel cell system to the outer load is stopped; and
    controlling means for controlling the charge allowance amount level in the secondary battery.

11. A method of controlling a fuel cell system, the fuel cell system having a secondary battery configured to supply electric power to an outer load and a fuel cell configured to supply electric power to the secondary battery and the outer load, the method comprising:
    calculating charge allowance amount level in the secondary battery;

calculating an excess amount of electric power that can be generated by an excess fuel gas remaining in the fuel cell system when a supply of electric power from the fuel cell system to the outer load is stopped; and controlling the charge allowance amount level in the secondary battery so as to be equal to or higher than the excess amount of electric power.

12. A fuel cell system according to claim 1, wherein the charge allowance amount level in the secondary battery determined by the charge allowance amount calculator is equal to or higher than the excess amount of electric power determined by the excess electric power calculator.

13. A fuel cell system according to claim 10, wherein the charge allowance amount level in the secondary battery is equal to or higher than the excess amount of electric power.

14. A fuel cell system, comprising:

a battery;

a fuel cell configured to supply electric power to the battery and an outer load;

a fuel reformer configured to supply fuel to the fuel cell;

a first calculator configured to calculate a charge allowance amount level in the battery, a second calculator configured to calculate an excess amount of electric power that can be generated using excess fuel remaining in the fuel cell system when a supply of reforming material to the fuel reformer is stopped and electric power to the outer load is stopped; and a controller configured to compare the charge allowance amount level to the excess amount of electric power.

15. A fuel cell system according to claim 14, wherein the controller is configured to limit an amount of fuel supplied to the fuel cell if the charge allowance amount level is equal to or less than the excess amount of electric power and if an operation load of the fuel cell system is changed from low to high.

16. A fuel cell system according to claim 14, wherein the controller is configured to permit operation of the fuel reformer if the charge allowance amount level is greater than the excess amount of electric power.

17. A fuel cell system according to claim 14, further comprising a combustor configured to receive the excess fuel remaining in the fuel cell system when a supply of reforming material to the fuel reformer is stopped and electric power to the outer load is stopped.

18. A fuel cell system according to claim 17, wherein the controller is configured to store the excess amount of electric power in the battery when an amount of the excess fuel is greater than an amount of fuel that can be processed by the combustor.

19. A fuel cell system according to claim 17, wherein the controller is configured to introduce the excess fuel into the combustor when an amount of the excess of fuel is equal to or less than an amount of fuel that can be processed in the combustor.

* * * * *